(12) United States Patent
Hartmann et al.

(10) Patent No.: US 6,264,414 B1
(45) Date of Patent: Jul. 24, 2001

(54) FASTENER FOR CONNECTING COMPONENTS INCLUDING A SHANK HAVING A THREADED PORTION AND ELONGATED PORTION AND A FITTING PORTION

(75) Inventors: Gunther Hartmann, Alsfeld; Wolfgang Sommer, Gemünden, both of (DE)

(73) Assignee: Kamax-Werke Rudolf Kellermann GmbH & Co., Osterode (DE)

( * ) Notice: Subject to any disclaimer, the term of this patent is extended or adjusted under 35 U.S.C. 154(b) by 0 days.

(21) Appl. No.: 09/479,540

(22) Filed: Jan. 7, 2000

(30) Foreign Application Priority Data

Jan. 12, 1999 (DE) ............................................... 199 00 791

(51) Int. Cl.[7] ..................................................... F16B 35/04
(52) U.S. Cl. ............................ 411/411; 411/916; 411/392
(58) Field of Search ................................... 411/411, 412, 411/424, 915, 916

(56) References Cited

U.S. PATENT DOCUMENTS

| | | | |
|---|---|---|---|
| 2,407,928 | * | 9/1946 | Hereshoff . |
| 3,455,587 | * | 7/1969 | Gallois . |
| 4,621,963 | * | 11/1986 | Reinwall . |
| 4,941,337 | * | 7/1990 | Emery . |
| 5,645,386 | * | 7/1997 | Damm . |

FOREIGN PATENT DOCUMENTS

| | | |
|---|---|---|
| 2 143 784 | 9/1971 | (DE) . |
| 3521 755 A1 | 6/1985 | (DE) . |
| 0 144 503 | 11/1986 | (EP) . |
| 0 313 927 B1 | 5/1991 | (EP) . |

\* cited by examiner

*Primary Examiner*—Flemming Saether
(74) *Attorney, Agent, or Firm*—Thomas, Kayden, Horstemeyer & Risley

(57) ABSTRACT

A fastener (1) for connecting at least two components includes a shank (4) having an axis. At least one threaded portion (7) is arranged at the shank (4), and it has a stressed cross section. At least one elongation portion (5) is arranged at the shank (4), and it has a stressed cross section. The stressed cross section of the at least one elongation portion (5) is less than the stressed cross section of the at least one threaded portion (7). At least one fitting portion (6) is arranged at the shank (4). It has a stressed cross section, and it includes a plurality of protrusions (9) and channels (10). The at least one elongation portion (5) and the at least one fitting portion (6) are spaced apart along the axis of the shank (4). The channels (10) have a root diameter determining the stressed cross section of the at least one fitting portion (6). The stressed cross section of the at least one fitting portion (6) is at least 20 percent more than the stressed cross section of the at least one elongation portion (5).

12 Claims, 3 Drawing Sheets

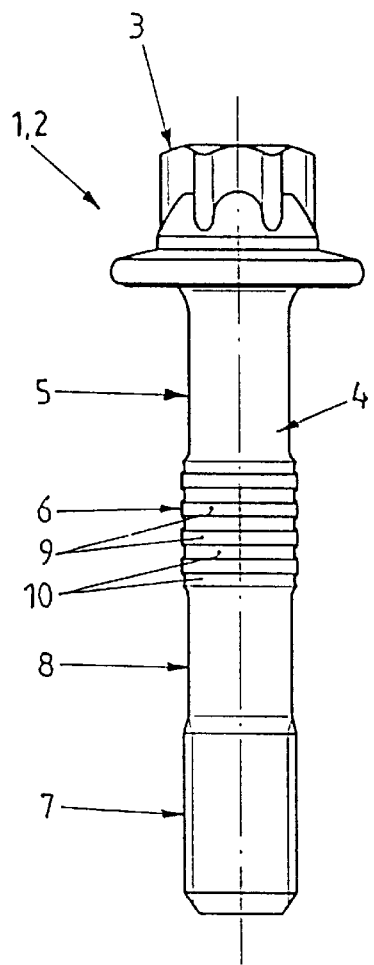
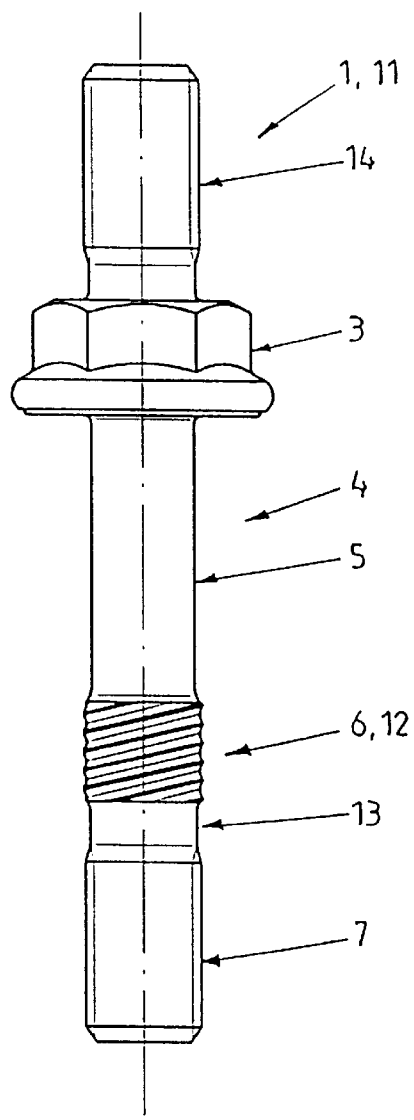
Fig. 1                    Fig. 2

FASTENER FOR CONNECTING COMPONENTS INCLUDING A SHANK HAVING A THREADED PORTION AND ELONGATED PORTION AND A FITTING PORTION

CROSS REFERENCE TO RELATED APPLICATIONS

This application claims the benefit of co-pending German Patent Application No. 199 00 791.8 entitled "Verbindungselement für zwei Maschinen- oder Bauteile, insbesondere Paβ-Dehnschraube, Paβ-Gewindebolzen o. dgl.", filed on Jan. 12, 1999.

FIELD OF THE INVENTION

The present invention generally relates to a fastener for connecting at least two components. More particularly, the present invention relates to a fastener, for example a fitting elongation screw or a fitting threaded bolt, having a shank including at least one threaded portion, one elongation portion and one fitting portion. The elongation portion and the fitting portion are spaced apart along the longitudinal axis of the shank.

BACKGROUND OF THE INVENTION

For example, the fastener or the connecting element may be designed in the form of a fitting elongation screw including a head. The fastener may also be designed in the form of a fitting threaded bolt additionally including a fastening thread.

Fasteners and connecting elements, especially fitting elongation screws and fitting threaded bolts, are generally used to connect two or more components or structures. The fasteners are tightened with relatively great preload forces to prevent an opening of the two components in their common contact area under operational conditions. To attain the necessary preload force, such fitting elongation screws are deformed beyond the elastic region of the material into the plastic region. The elastic region is the region of the material in which the material is exclusively deformed elastically. The plastic region is the region in which the material is deformed both elastically and plastically. This elastic/plastic region is entered by tightening the fitting elongation screw. The tightening process usually is either angle-controlled or yield-controlled.

A fastener for connecting two components in the form of a fitting elongation screw is known from European Patent Application No. 0 313 927 A1. The fitting elongation screw includes a head for transmitting torque and a shank including a threaded portion, at least one elongation portion and at least one fitting portion including protrusions and channels. The threaded portion, the elongation portion and the fitting portion are axially spaced apart along the shank. The elongation portion includes protrusions and channels. The protrusions and channels of the fitting portion and of the elongation portion are different, but they all have the design of a thread. The root diameter of the channels of the fitting portion is more than the root diameter of the channels of the elongation portion, preferably at least by 10 percent. In this way, a plastic transverse contraction, meaning a reduction of the diameter, is prevented in the fitting portion during a deformation of the fitting elongation screw into the transelastic region, meaning a tightening of the fitting elongation screw beyond the elastic region into the plastic region. The outer diameter of the fitting portion is more than the outer diameter of the elongation portion, and it is also more than the outer diameter of the threaded portion. This fitting elongation screw may be produced from a shank having a constant diameter along its length by axial displacement of material, and an enlargement of the outer diameter of the protrusions resulting therefrom. The axial width at the outer diameter of the protrusions is relatively small. Additionally, it is even smaller in the fitting portion than in the elongation portion. Consequently, the bearing portion of the fitting portion is very small. Thus, a minimum surface is usable to receive transverse forces in the fitting portion. The design of the elongation portion including spaced apart protrusions and channels reduces the fatigue strength and the dynamic properties of the fastener.

Another fitting elongation screw is known from German Patent Application No. 2 143 784. The function of the fitting portion and the function of the elongation portion are fulfilled by a common portion of the shank of the screw. The shank includes a fitting thread, meaning an inclined arrangement of protrusions and channels in the fitting elongation portion. The root diameter of the fitting elongation portion is less than the root diameter of the connecting portion by 2 to 10 percent. In this way, the elastic elongation and the fatigue strength of the fitting elongation screw is improved. An axial elongation occurs in the region of the fitting elongation portion in combination with a permanent reduction of the outer diameter when the fitting elongation screw is tightened beyond the elastic region. The fitting elongation portion loses the functionality of the fitting portion and the fitting elongation screw is not reusable as desired.

Another fitting elongation screw is known from European Patent No. 0 144 503 B1. The fitting elongation screw includes a shank including a threaded portion and a fitting elongation portion. The fitting elongation portion includes non-inclined protrusions and channels. The outer diameter of the protrusions in the fitting elongation portion is more than the outer diameter in the threaded portion by 0.1 to 0.5 mm. The stressed cross section corresponding to the root diameter of the channels in the fitting elongation portion has the same dimensions as the stressed cross section of the threaded portion. In this way, a fitting elongation screw only being used in the region of an elastic elongation is provided.

SUMMARY OF THE INVENTION

Briefly described, the present invention provides an a fastener for connecting at least two components. The fastener includes a shank having an axis. At least one threaded portion is arranged at the shank, and it has a stressed cross section. At least one elongation portion is arranged at the shank, and it has a stressed cross section. The stressed cross section of the at least one elongation portion is less than the stressed cross section of the at least one threaded portion. At least one fitting portion is arranged at the shank. It has a stressed cross section, and it includes a plurality of protrusions and channels. The at least one elongation portion and the at least one fitting portion are spaced apart along the axis of the shank. The channels have a root diameter determining the stressed cross section of the at least one fitting portion. The stressed cross section of the at least one fitting portion is at least 20 percent more than the stressed cross section of the at least one elongation portion.

The present invention is based on the idea to arrange the fitting portion and the elongation portion of the fastener axially spaced apart at the shank of the fastener, and to separate the functions of the fitting portion and the elongation portion. For this reason, the threaded portion, the elongation portion and the fitting portion are arranged at the shank of the fastener or the connecting element with a special design and special dimensions. The three portions are designed and arranged to be coordinated with each other. The elongation properties or the extensibility of the fastener, especially in case of dynamic loads, are substantially determined by the elongation portion. The stressed cross section of the elongation portion is designed to be less than the stressed cross section of the threaded portion. On the other hand, it is important that the fitting portion does not fulfill a substantial elongation function, but instead it permanently maintains its properties being important to its fitting properties. Consequently, the fitting properties of the fastener are also maintained beyond the elastic region of the material such that the fastener or the connecting element, for example a screw or a bolt, is reusable. For this purpose, the stressed cross section of the fitting portion is at least 20 percent more than the stressed cross section of the elongation portion. The stressed cross section of the fitting portion $A_R$ is calculated according to the equation $$(X)\ A_R = \pi/4 * d_{3R}^2,$$

the stressed cross section resulting from the root diameter or the core diameter of the fitting portion.

The stressed cross section of the elongation portion $A_T$ of also results from the equation $$(Y)\ A_T = \pi/4 * d_T^2,$$

the diameter $D_T$ of the elongation portion and the root diameter of an elongation portion including protrusions or channels, respectively, being used for the calculation.

The elongation portion and the fitting portion are structured and their dimensions are determined with respect to one another such that the stressed cross section of the fitting portion is at least 20 percent more than the stressed cross section of the elongation portion. Thus, the equation $$(A)\ A_R \geq 1.2 * A_T$$

applies. In this way, the ratio between the root diameter of the fitting portion with respect to the diameter or the root diameter of the elongation portion, respectively, is determined. At the same time, the stressed cross section of the fitting portion has to be at least 20 percent more than the stressed cross section of the threaded portion. The stressed cross section $A_S$ of the thread is calculated by the equation $$A_S = \frac{\pi}{4} \times \left(\frac{d_2 + d_3}{2}\right)^2 \quad (Z)$$

showing that the effective diameter as well as the root diameter of the threaded portion are used to calculate the stressed cross section $A_S$ of the thread. In this way, the stressed cross section $A_R$ of the elongation portion is determined with respect to the stressed cross section of the threaded portion according to the equation $$(B)\ A_R \geq 1.2 * A_S.$$

In other words, the stressed cross section of the elongation portion is always less than the stressed cross section of the fitting portion and less or equal to the stressed cross section of the threaded portion. Especially in case when the elongation portion does not include protrusions, swellings, channels, groves or slots, meaning that the elongation portion has a continuously cylindrical design, the fastener or the connecting element has outstanding elastic properties and an improved fatigue strength since the elongation and extension of the fastener are substantially limited to the region of the elongation portion. Additionally, there is no notch effect in the region of the elongation portion. The novel fastener withstands substantial deformations and the likelihood of the fastener breaking is substantially reduced. At the same time, the fatigue strength in case of a dynamic load is improved. The fatigue strength of the novel fastener including an elongation portion not being profiled is improved more than 10 percent with respect to the values of fitting elongation screws known in the prior art in which the elongation portion includes protrusions and channels.

Consequently, it is especially advantageous if the elongation portion does not include protrusions and channels, but if it is rather designed to be continuously cylindrical. With this design, an optimized elastic/plastic flexibility is attained. The novel fitting elongation screw having a non-profiled elongation portion provides outstanding tightening properties in the region beyond the elastic region. Due to the small difference between the screw force $Fp_{0.2}$ of the 0.2 percent elongation limit and the maximum pulling force $F_{max}$ of the screw (meaning a flat course of the curve in the diagram showing the ratio of the force and the distance), the novel connection element is mountable in the transelastic region at very low scattering of the preload force. The stressed cross section of the elongation portion may be less than the stressed cross section of the threaded portion up to 30 percent. Consequently, the following equation applies to the ratio between the stressed cross section $A_T$ of the elongation portion and the stressed cross section $A_S$ of the threaded portion:

$$(C)\ A_T = 0.7 \ldots 0.99 * A_S.$$

The fastener of this embodiment not only has the advantage of improved elastic properties, but it also has improved fatigue properties.

The fitting portion may have a surface beating portion of at least 25 percent with respect to a cylindrical portion of the same diameter and of the same length. To fulfill the above described dependencies between the stressed cross sections, the following equation has to be fulfilled:

$$(D)\ d_{fR} \geq 1.1 * d_T.$$

The starting diameter $d_{fR}$ of the fitting portion, meaning for example the roll diameter, is more than 10 percent greater than the diameter of the finished elongation portion.

The outer diameter of the protrusions of the fitting portion may be more than the outer diameter of the threaded portion up to 20 percent. The following equation applies:

$$(E)\ d_R = 1 \ldots 1.2 * d.$$

There is a number of possible designs of the protrusions and channels of the fitting portion. A first possibility is to design the protrusions and channels of the fitting portion to fully extend about the axis of the shank. This means that the channels and protrusions are arranged to rotate about the shank. The protrusions and channels may be arranged at an equal distance such that they do not contact one another. Another possibility is to design the protrusions and channels of the fitting portion as an inclined single-flight or double-flight profile. With such a design, it makes sense that the surface bearing portion is at least 25 percent.

The axial length of the elongation portion is at least 40 percent of the clamping length of the fastener. The portion of the clamping length $l_K$ being formed by the threaded portion depends on the design of the element with which the fastener gets in contact. For example, this element may be a nut corresponding to the fitting elongation screw. The length of the elongation portion results from the clamping length $l_K$ according to the equation $$(F) \quad l_T \geq 0.4 * l_K.$$

The fastener may be produced by cold forming and calibrating of the protrusions and channels of the fitting portion without further machining. The protrusions of the fitting portion are produced by rolling, profile rolling or jumping of the shank between the elongation portion and the threaded portion. After a heat treating process of the fastener, the producing process is finished by a treatment in the form of calibrating the tips of the protrusions according to the above described dependencies. During this process, the root diameter $d_{3R}$ of the fitting portion remains unchanged.

The elongation portion of the fastener is produced without cutting, and it has a flexibility according to the equation:

$$\delta_S = \frac{4}{\pi} \times \frac{l_T}{E \times d_t^3} \qquad (G)$$

The flexibility $\delta_S$ is determined by the modulus of elasticity E of the material of the fitting elongation screw and the length and the diameter of the elongation portion.

Other objects, features and advantages of the present invention will become apparent to one with skill in the art upon examination of the following drawings and the detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 is a side view of a fastener in the form of a fitting elongation screw.

FIG. 2 is a side view of a fastener in the form of a fitting threaded bolt.

DETAILED DESCRIPTION

Figure 4:
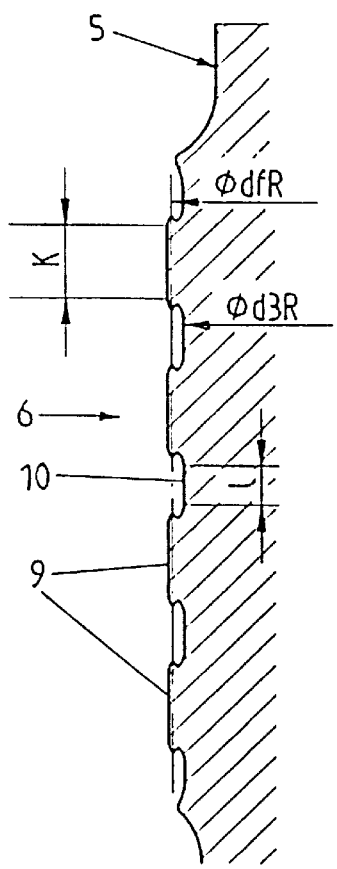
FIG. 4 is a detailed view of the fitting elongation screw according to FIG. 3.

In the following detailed description of the drawings, the below listed definitions are used having the listed meaning.

d=outer diameter of the threaded portion
$d_2$=effective diameter of the threaded portion
$d_3$=root diameter of the threaded portion
$d_R$=outer diameter of the fitting portion
$d_{fR}$=starting diameter (roll diameter) of the fitting portion
$d_{3R}$=root diameter of the fitting portion
$d_T$=diameter of the elongation portion
K=axial width of the protrusions at the outer diameter of the fitting portion
l=axial width of the channels at the root diameter of the fitting portion
$A_S$=stressed cross section at the threaded portion
$A_R$=stressed cross section at the fitting portion
$A_T$=stressed cross section of the elongation portion
$\delta_S$=flexibility of the elongation portion
$l_T$=length of the elongation portion
$l_K$=clamping length of the fastener
b=length of the threaded portion
$l_R$=length of the fitting portion
$Fp_{0.2}$=screw force at the 0.2 percent elongation limit
$F_{max}$=maximum tractive force at the screw
E=modulus of elasticity of the material of the screw FIGS. 1 to 4 illustrate exemplary embodiments of fasteners 1. The fastener 1 being illustrated in FIG. 1 is designed as a fitting elongation screw 2. The fitting elongation screw 2 includes a head 3 and a shank 4. The head 3 may be of any design. The design of the head 3 is not important to the present invention.

The shank 4 extends from the head 3 to the free end of the fitting elongation screw 2. An elongation portion 5, a fitting portion 6 and a threaded portion 7 are arranged at the shank 4. The portions 5, 6 and 7 are axially spaced apart with respect to one another. The threaded portion 7 is arranged at the free end of the shank 4. The elongation portion 5 and the fitting portion 6 are arranged in the region of the shank between the head 3 and the threaded portion 7. The fitting elongation screw 2 includes at least one elongation portion 5. The embodiment of the fastener 1 as illustrated in FIG. 1 includes an additional second elongation portion 8. The portions 5, 6, 7 and 8 are axially spaced apart with respect to one another along the axis of the shank 4 of the fastener 1, as it is illustrated in FIG. 1. In this embodiment, the fitting portion 6 is surrounded by the two elongation portions 5 and 8.

The elongation portions 5 and 8 are designed to be continuously cylindrical. It is understood that the cylindrical design of the elongation portions 5 and 8 changes in the region of their ends being connected to other portions. The fitting portion 6 includes protrusions 9 and channels 10. The protrusions 9 project toward the outside. The channels 10 are arranged at a smaller diameter than the protrusions 9, and they are therefore arranged behind the protrusions 9.

FIG. 2 illustrates a fastener 1 for a connecting element 1 in the form of a fitting threaded bolt 11. The threaded bolt 11 includes a head 3 and a shank 4. An elongation portion 5, a fitting portion 6 and a threaded portion 7 are axially spaced apart the shank 4. The fitting portion 6 is designed as a spiral-like profile 12. The spiral-like profile 12 may be single-flied or double-flied. An intermediate portion 13 may be arranged between the spiral-like profile 12 and the threaded portion 7, the intermediate portion having a comparatively short axial length. The elongation portion 5 has a comparatively great axial length.

In this embodiment of the fastener 1 as fitting threaded bolt 11, a fastening threaded portion 14 is arranged at the fastener 1. The fastening threaded portion 14 extends from the side of the head 3 facing away from the shank 4.

Figure 3:
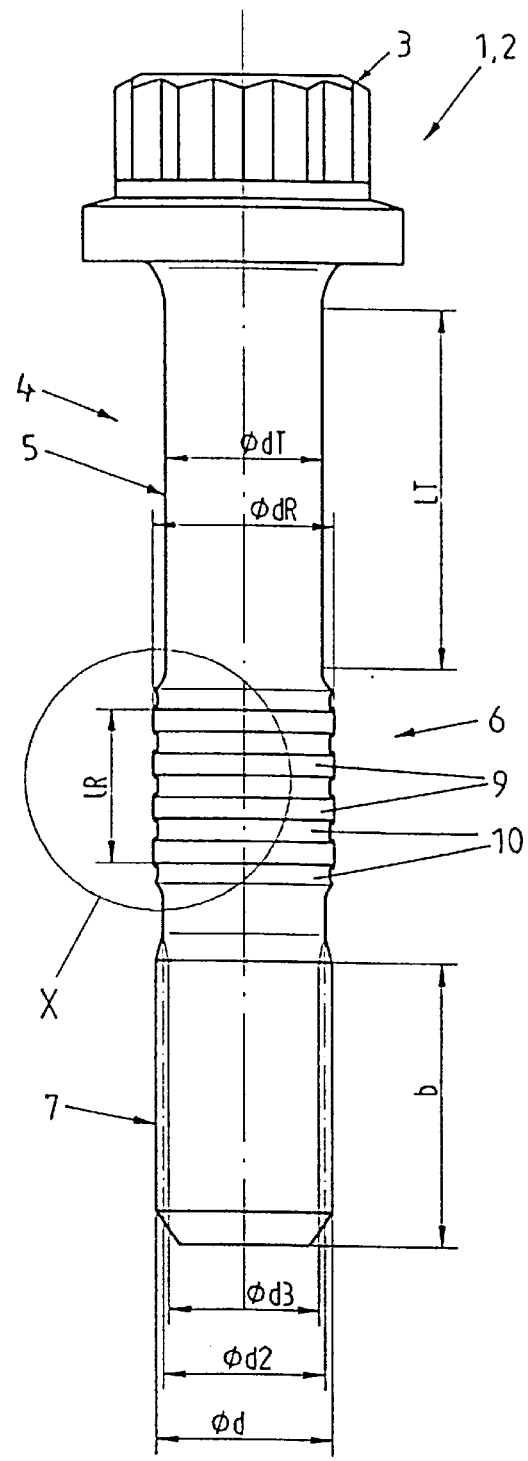
FIG. 3 is a side view of another fitting elongation screw.
Figure 5:
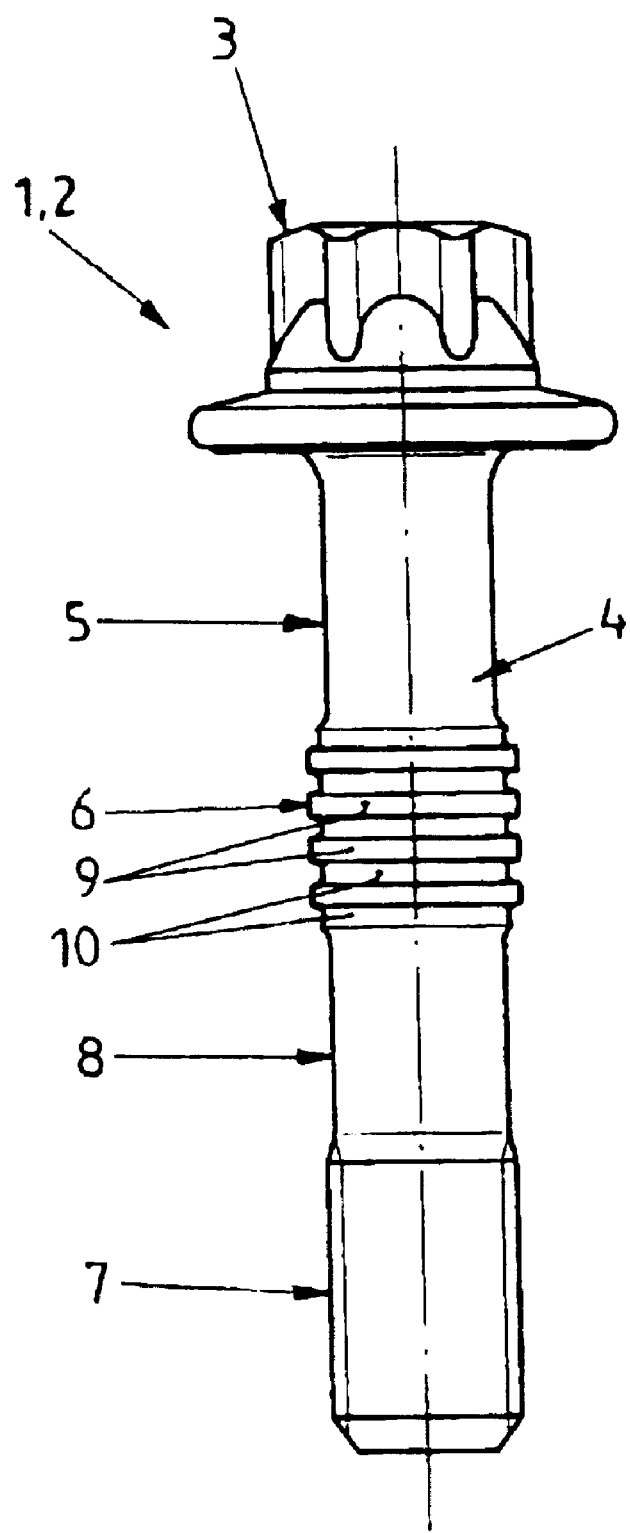
FIG. 5 is a view similar to FIG. 1, illustrating the fastener of shorter length and larger diameter protrusions in the fitting portion.

FIG. 3 illustrates another embodiment of the fastener 1 in the form of a fitting elongation screw 2. FIG. 4 shows more details of the embodiment of FIG. 3. FIGS. 3 and 4 illustrate the technical designations from the above list, starting from the outer diameter d of the threaded portion 7 to the length $l_R$ of the fitting portion 6. The non-illustrated clamping length $l_K$ of the shank 4 substantially results from the length of the elongation portion 5, the length of the fitting portion 6 and part of the length of the threaded portion 7. Consequently, the clamping length $l_K$ corresponds to the height of the two components or structures to be connected by the fastener 1. The outer diameter d of the threaded portion 7 corresponds to the nominal diameter of the fastener 1 and of its threaded portion 7, respectively. FIG. 4 also illustrates the starting diameter $d_{fR}$ of the fitting portion 6. This diameter corresponds to the roll diameter, i.e. the starting diameter of the fitting portion 6 before the protrusions 9 and the channels 10 are produced by cold forming.

In the following, an exemplary embodiment of the fitting elongation screw 2 is explained in more detail. The dimensions and the corresponding stressed cross sections result from the below listed equations:

$$\boxed{A_R = \frac{\pi}{4} \times d_{3R}^2} \quad (X)$$

$$A_R = \frac{\pi}{4} \times 8{,}85\,\text{mm}^2 = 61{,}51\,\text{mm}^2$$

$$\boxed{A_T = \frac{\pi}{4} \times d_T^2} \quad (Y)$$

$$A_T = \frac{\pi}{4} \times 7{,}8\,\text{mm}^2 = 47{,}78\,\text{mm}^2$$

$$\boxed{A_S = \frac{\pi}{4}\left(\frac{d_2 + d_3}{2}\right)^2} \quad (Z)$$

$$A_S = \frac{\pi}{4}\left(\frac{8{,}29\,\text{mm} + 7{,}7\,\text{mm}}{2}\right)^2 = 50{,}20\,\text{mm}^2$$

$$\boxed{A_R \geq 1{,}2 \times A_T} \quad (A)$$

$$A_R = 61{,}51\,\text{mm}^2 = 1{,}287 \times 47{,}78\,\text{mm}^2$$

$$\boxed{A_R \geq 1{,}2 \times A_S} \quad (B)$$

$$A_R = 61{,}51\,\text{mm}^2 = 1{,}225 \times 50{,}20\,\text{mm}^2$$

$$\boxed{A_T = 0{,}7 \ldots 0{,}99 \times A_S} \quad (C)$$

$$A_T = 47{,}78\,\text{mm}^2 = 0{,}952 \times 50{,}20\,\text{mm}^2$$

$$\boxed{d_{jR} \geq 1{,}1 \times d_T} \quad (D)$$

$$d_{jR} = 9{,}1\,\text{mm} = 1{,}167 \times 7{,}8\,\text{mm}$$

$$\boxed{d_R = 1 \ldots 1{,}2 \times d} \quad (E)$$

$$d_R = 9{,}199\,\text{mm} = 1{,}032 \times 8{,}91\,\text{mm}$$

$$\boxed{l_T \geq 0{,}4 \times l_K} \quad (F)$$

$$l_T = 16{,}4\,\text{mm} = 0{,}499 \times 32{,}83\,\text{mm}$$

$$\boxed{\delta_S = \frac{4}{\pi} \times \frac{l_T}{E \times d_T^2}} \quad (G)$$

$$\delta_S = \frac{4}{\pi} \times \frac{16{,}4\,\text{mm}}{205000\frac{N}{\text{mm}^2} \times 7{,}8\,\text{mm}^2} = 1{,}674 \times 10^{-6} \frac{\text{mm}}{N}$$

The following values correspond to the above mentioned exemplary embodiment:

| | | | |
|---|---|---|---|
| $d$ | = | 8.86...8.97 | mm |
| $d_2$ | = | 8.25...8.32 | mm |
| $d_3$ | = | 7.64...7.75 | mm |
| $d_R$ | = | 9.197...9.210 | mm |
| $d_{fR}$ | = | 9.075...9.125 | mm |
| $d_{3R}$ | = | 8.80...8.90 | mm |
| $d_T$ | = | 7.70...7.90 | mm |
| $K$ | = | 1.10 | mm |
| $l$ | = | 0.60 | mm |
| $A_S$ | = | 50.20 | mm$^2$ |
| $A_R$ | = | 61.51 | mm$^2$ |
| $A_T$ | = | 47.78 | mm$^2$ |
| $\delta_S$ | = | $1.674 * 10^{-6}$ | mm/N |
| $l_T$ | = | 16.40 | mm |
| $l_K$ | = | 32.83 | mm |
| $b$ | = | 16.30 | mm |
| $l_R$ | = | 7.10 | mm |
| $Fp_{0.2}$ | = | 56.90 | kN |
| $F_{max}$ | = | 61.50 | kN |
| $E$ | = | 205000 | N/mm$^2$ |

Many variations and modifications may be made to the preferred embodiments of the invention without departing substantially from the spirit and principles of the invention. All such modifications and variations are intended to be included herein within the scope of the present invention, as defined by the following claims.

We claim:

1. A fastener for connecting at least two components, comprising:
    a shank having an axis;
    at least one threaded portion being arranged at said shank and having a stressed cross section;
    at least one elongation portion being arranged at said shank and having a stressed cross section, the stressed cross section of said at least one elongation portion being less than the stressed cross section of said at least one threaded portion up to 30 percent;
    at least one fitting portion being arranged at said shank, having a stressed cross section and including a plurality of protrusions and channels, said at least one elongation portion and said at least one fitting portion being spaced apart along the axis of said shank, said channels having a root diameter determining the stressed cross section of said at least one fitting portion, the stressed cross section of said at least one fitting portion being at least 20 percent more than the stressed cross section of said at least one elongation portion.

2. The fastener of claim 1, wherein said elongation portion is designed to be continuously cylindrical without protrusions and channels.

3. The fastener of claim 1, wherein said at least one fitting portion has a surface bearing portion of at least 25 percent with respect to a cylindrical reference portion of the same diameter and the same length.

4. The fastener of claim 1, wherein said at least one threaded portion has an outer diameter, wherein said protrusions of said at least one fitting portion have an outer diameter, and wherein the outer diameter of said protrusions is more than the outer diameter of said at least one threaded portion up to 20 percent.

5. The fastener of claim 1, wherein said protrusions and said channels of said at least one fitting portion are designed and arranged to fully extend about the axis of said shank.

6. The fastener of claim 1, wherein said protrusions and said channels of said at least one fitting portion are designed and arranged to form an inclined spiral profile.

7. The fastener of claim 6, wherein said spiral profile is single-flight.

8. The fastener of claim 6, wherein said spiral profile is double-flight.

9. The fastener of claim 1, wherein said protrusions and said channels of said at least one fitting portion are produced by cold forming and calibrating.

10. The fastener of claim 9, wherein said at least one fitting portion is produced without cutting, and it has a flexibility according to the equation $$\delta_S = \frac{4}{\pi} \times \frac{l_T}{E \times d_T^2}, \tag{G}$$

wherein $\delta_S$ represents the flexibility of said elongation portion, $l_T$ represents the length of said elongation portion, E represents the modulus of elasticity of the material of said fastener and $d_T$ represents the diameter of said elongation portion.

11. The fastener of claim 1, wherein said fastener is a fitting elongation screw.

12. The fastener of claim 1, wherein said fastener is a fitting threaded bolt.

* * * * *